United States Patent
Kim

(10) Patent No.: US 10,288,919 B2
(45) Date of Patent: May 14, 2019

(54) IRREGULAR SHAPE DISPLAY DEVICE HAVING HOLE

(71) Applicant: LG Display Co., Ltd., Seoul (KR)

(72) Inventor: Miok Kim, Busan (KR)

(73) Assignee: LG Display Co., Ltd., Seoul (KR)

( * ) Notice: Subject to any disclaimer, the term of this patent is extended or adjusted under 35 U.S.C. 154(b) by 49 days.

(21) Appl. No.: 15/288,217

(22) Filed: Oct. 7, 2016

(65) Prior Publication Data

US 2017/0153487 A1    Jun. 1, 2017

(30) Foreign Application Priority Data

Nov. 30, 2015    (KR) .................. 10-2015-0169209

(51) Int. Cl.
| | |
|---|---|
| *F21V 8/00* | (2006.01) |
| *B60K 35/00* | (2006.01) |
| *B60K 37/02* | (2006.01) |
| *G04G 17/04* | (2006.01) |

(Continued)

(52) U.S. Cl.
CPC ........ *G02F 1/133308* (2013.01); *B60K 35/00* (2013.01); *B60K 37/02* (2013.01); *G02B 6/0055* (2013.01); *G02B 6/0088* (2013.01); *G02F 1/1339* (2013.01); *G04G 17/045* (2013.01); *B60K 2350/106* (2013.01); *G02B 6/005* (2013.01); *G02F 2001/133314* (2013.01); *G02F 2001/133322* (2013.01); *G02F 2201/46* (2013.01); *G02F 2201/56* (2013.01)

(58) Field of Classification Search
CPC ............. G02F 1/133308; G02F 1/1339; G02F 2001/133314; G02F 2001/133322; G02F 2201/46; G02F 2201/56; B60K 37/00; G02B 6/0055; G02B 6/0088; G02B 6/005; G04G 9/0023

See application file for complete search history.

(56) References Cited

U.S. PATENT DOCUMENTS

| | | |
|---|---|---|
| 5,751,667 A | 5/1998 | Nunes |
| 6,473,554 B1 | 10/2002 | Pelka et al. |
| 2008/0129916 A1 | 6/2008 | Ota et al. |

(Continued)

FOREIGN PATENT DOCUMENTS

| | | |
|---|---|---|
| GB | 2084764 A | 4/1982 |
| JP | 2010-139657 A | 6/2010 |

(Continued)

OTHER PUBLICATIONS

Combined Search and Examination Report dated Mar. 16, 2017 issued by the U.K. Intellectual Property Office in the corresponding U.K. Patent Application No. 1620263.2.

(Continued)

*Primary Examiner* — Nathanael R Briggs
(74) *Attorney, Agent, or Firm* — Polsinelli PC

(57) ABSTRACT

An irregular shape display having a hole according to the present disclosure may apply a partial cylinder-shaped guide member to a hole region while at the same time fastening between a guide member and a lower cover through a thread, thereby securing fastenability.

The present disclosure provides an effect of preventing a rattle noise due to the detachment, splitting and component floating of an optical sheet as fastenability between the guide member and lower cover is secured.

16 Claims, 10 Drawing Sheets

(51) Int. Cl.
    *G02F 1/1333*     (2006.01)
    *G02F 1/1339*     (2006.01)

(56) References Cited

U.S. PATENT DOCUMENTS

| | | |
|---|---|---|
| 2010/0110624 A1 | 5/2010 | Wu et al. |
| 2013/0215356 A1 | 8/2013 | Yu |
| 2014/0293141 A1* | 10/2014 | Tsubokura ........ G02F 1/133308 349/1 |
| 2015/0169011 A1* | 6/2015 | Bibl ..................... G06F 3/0412 345/175 |
| 2017/0059771 A1* | 3/2017 | Yuki ................ G02F 1/133615 |

FOREIGN PATENT DOCUMENTS

| | | |
|---|---|---|
| JP | 2014-191114 A | 10/2014 |
| JP | 2014-206654 A | 10/2014 |
| KR | 10-2009-0054722 A | 6/2009 |
| KR | 10-2010-0038921 A | 4/2010 |
| KR | 10-2013-0028432 A | 3/2013 |
| KR | 10-2015-0056363 A | 5/2015 |
| TW | M463029 U | 10/2013 |
| WO | 2013/018619 A1 | 2/2013 |
| WO | 2015/178299 A1 | 11/2015 |
| WO | 2015/178302 A1 | 11/2015 |

OTHER PUBLICATIONS

Office Action dated Sep. 26, 2016 in the corresponding Korean patent application No. KR 10-2015-0169209.
Office Action dated Dec. 26, 2017 in a Taiwanese patent application No. 105136730.

* cited by examiner

IRREGULAR SHAPE DISPLAY DEVICE HAVING HOLE

CROSS-REFERENCE TO RELATED APPLICATIONS

This application claims the benefit of Korean Patent Application No. 10-2015-0169209, filed in the Republic of Korea on Nov. 30, 2015, which is hereby incorporated by reference in its entirety.

BACKGROUND

Field of the Disclosure

The present disclosure relates to a display device, and more particularly, to an irregular shape display (or non-tetragonal shaped display) having a hole.

Description of the Related Art

In the recent information society, the importance of display (or display devices) is more emphasized as a visual information transmission medium, but their requirements such as low power consumption, thin profile, light weight, high picture quality should be satisfied in order to take the principal position in the future.

Display devices can be divided into an emissive type display capable of spontaneously emitting light such as cathode ray tube (CRT), electro luminescence (EL), light emitting diode (LED), vacuum fluorescent display (VFD), field emission display (FED), plasma display panel (PDP), and the like, and a non-emissive type display incapable of spontaneously emitting light such as liquid crystal display (LCD) device.

The liquid crystal display is a device for implementing images using optical anisotropy of liquid crystal molecules, and in recent years, it has been mostly used as a device along with a PDP display because its visibility is more excellent than a CRT, and its average power consumption and heat dissipation is lower than that of CRT with the same screen size.

Hereinafter, a typical liquid crystal display device will be described in detail.

In general, a liquid crystal display device may individually supply a data signal according to image information to pixels arranged in a matrix form and adjust the light transmittance of the pixels to display a desired image.

Accordingly, the liquid crystal display (LCD) may include a liquid crystal panel in which pixels are arranged in a matrix form, and a drive unit for driving pixels and a backlight unit for supplying light to the liquid crystal panel.

FIG. 1 is an exploded perspective view schematically illustrating the structure of a typical liquid crystal display device.

Furthermore, FIG. 2 is a view schematically illustrating a cross-section taken along line A-A' in the typical liquid crystal display device illustrated in FIG. 1.

Referring to FIGS. 1 and 2, the typical liquid crystal display device includes a liquid crystal panel 10 in which pixels are arranged in a matrix form to display an image, and a drive unit (not shown) for driving pixels, a backlight unit 40 provided on a rear surface of the liquid crystal panel 10 to emit light over the entire surface of the liquid crystal panel 10, and a lower cover 50 for accommodating and fixing the liquid crystal panel 10 and backlight unit 40.

The liquid crystal panel 10 includes a color filter substrate 5 bonded thereto to maintain a uniform cell gap to face each other, an array substrate 15, and a liquid crystal layer (not shown) formed in a cell gap between the color filter substrate 5 and array substrate 15.

Upper and lower polarizers 1, 11 are respectively adhered to an outer side of the liquid crystal panel 10, wherein the lower polarizer 11 polarizes light passed through the backlight unit 40, and the upper polarizer 1 polarizes light passed through the liquid crystal panel 10.

Describing the backlight unit 40 in detail, a light emitting diode (LED) assembly 30 for emitting light is provided at one side of a light guide plate 42, and a reflector 41 is provided on a rear surface of the light guide plate 42.

Further, the LED assembly 30 includes an LED array 31, an LED array printed circuit board (PCB) (not shown) for driving the LED array 31, and a housing 32.

Light emitted from the LED array 31 is entered to a lateral surface of the light guide plate 42 having a transparent material, and the reflector 41, and the reflector 41 disposed on a rear surface of the light guide plate 42 reflects light transmitted through the rear surface of the light guide plate 42 to the side of optical sheets on the upper surface of the light guide plate 42 to reduce the loss of light and enhance the uniformity.

The liquid crystal panel 10 consisting of the color filter substrate 5 and array substrate 15 is mounted on an upper portion of the backlight unit 40 having the foregoing configuration through a guide panel 45, and the lower cover 50 is coupled to a lower portion thereof to constitute a liquid crystal display device.

In other words, the liquid crystal panel 10 is mounted on a mounting portion 45a, 45b of the guide panel 45 through an adhesive tape 46, and the lower cover 50 is coupled to a fastening portion 45' on a lateral surface of the guide panel 45 through a hook 51 at an outer side thereof.

Here, a product with a circular shape out of the existing rectangular design may be referred to as an irregular shape display, and the different form has the meaning that the property, shape, type of things are different from the existing things. In other words, an irregular shape display refers to as a display having a shape of which is modified in various ways such as a circular or diamond shape out of the existing or traditional rectangular display.

Since the irregular shape display is fabricated in various shapes contrary to the existing rectangular display, and the fabrication process thereof is important. Furthermore, a very thin bezel that is capable of satisfying user's convenience as well as trendier and slimmer than the conventional products should be necessary.

Here, when the guide panel 45 formed of a mold is applied thereto, a molding thickness of at least 0.6-0.8 mm is required, and thus restrictive in applying a narrow bezel structure less than 1.5 mm.

Furthermore, the molding and dimensional design error is more restrictive in a structure to which the foregoing hook 51 is applied to an outer side of the lower cover 50 or the hook is applied to an inner side of the guide panel 45.

In addition, as displays are widely used in various fields while increasing the usage thereof in recent years, the development of displays according to their application fields is required. For an example, a case where one or more holes for allowing mechanical parts in wearable watches such as a second hand, a minute hand, an hour hand or the like to pass therethrough are provided within a screen area of a display should be taken into consideration.

SUMMARY

The present disclosure is contrived to solve the aforementioned problem and an object of the invention is to provide a irregular shape display having one or more holes within a screen area of a display.

Another object of the invention is to provide a different type of display having a hole for securing fastenability between a liquid crystal panel and a backlight.

Other objects and features of the present disclosure will be described in the configuration of the invention and claims which follow hereinbelow.

In order to accomplish the foregoing object, a irregular shape display according to an embodiment of the present disclosure may include a backlight unit located at a lower portion of a liquid crystal panel, a lower cover configured to accommodate the liquid crystal panel and the backlight unit, at least one hole provided in a predetermined region of the liquid crystal panel and the lower cover to allow a mechanical part to pass therethrough, and a guide member fastened to the lower cover through the hole between the liquid crystal panel and the lower cover.

Here, the backlight unit may include a light source unit comprising a light source, located at one side of a light guide plate to generate light, a reflector disposed on a rear surface of the light guide plate, and optical sheets disposed on an upper surface of the light guide plate.

Here, an outside of the liquid crystal panel, the optical sheet, the light guide plates, the reflector and the lower cover may have a curved shape or polygonal shape or a mixed shape of a curve and a polygon.

The hole may include a first hole provided on the liquid crystal panel, a second hole provided on the optical sheets, a third hole provided on the light guide plate, a fourth hole provided on the reflector, and a fifth hole provided on the lower cover.

Here, the first through the fifth hole may have a curved shape or polygonal shape or have a mixed shape of a curve and a polygon.

The first hole may have a diameter larger than that of the second holes, the third hole and the fourth hole, and the second holes, the third hole and the fourth hole may have a diameter larger than that of the fifth hole.

The reflector may include the fifth hole and have a shape surrounding a lateral edge of the light guide plate.

The lower cover may include a plurality of side portions extended in perpendicular to a bottom, and a mounting portion configured with the side portions being respectively bent toward the center.

Here, an edge of the liquid crystal panel may be mounted on the mounting portions of the lower cover.

The side portions and mounting portions of the lower cover may be bent in a "⊏"-shape from the bottom of the lower cover, and the light guide plate and the optical sheets may be fixed to an inner portion of the lower cover by the side portions and mounting portions of the lower cover bent in a "⊏"-shape.

The lower cover may include a protruding portion protruded toward the liquid crystal panel from an edge of the fifth hole.

Here, the protruding portion of the lower cover may accommodate the optical sheets, the light guide plate and the reflector into the lower cover through the second holes, the third hole and the fourth hole.

The guide member may include a body having a cylinder shape into which the liquid crystal panel is inserted through the first hole, a support portion extended in an outward direction from an outer circumferential surface of the body, on which an edge of the liquid crystal panel around the first hole is mounted, and a fastening portion extended downward from an inner edge of the support portion and fastened to the protruding portion of the lower cover.

Here, the fastening portion may have a cylinder shape, and an external diameter and an internal diameter of the fastening portion may have a size smaller than those of the body.

The guide member may include a thread corresponding to that of the protruding portion at an outer side of the fastening portion inserted into an inner side of the protruding portion.

Alternatively, the guide member may include a thread corresponding to that of the protruding portion at an inner side of the fastening portion inserted into an outer side of the protruding portion.

The liquid crystal panel may display an image in a region excluding the hole.

A lateral edge of the liquid crystal panel may be sealed with a sealing material through side sealing.

As described above, a irregular shape display having a hole according to an embodiment of the present disclosure may secure fastenability between a guide member and a lower cover in a hole region, thereby providing an effect of preventing the detachment and splitting of an optical sheet as well as preventing a rattle noise due to light leakage and floating.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure.

In the drawings.

DETAILED DESCRIPTION

Figure 1:
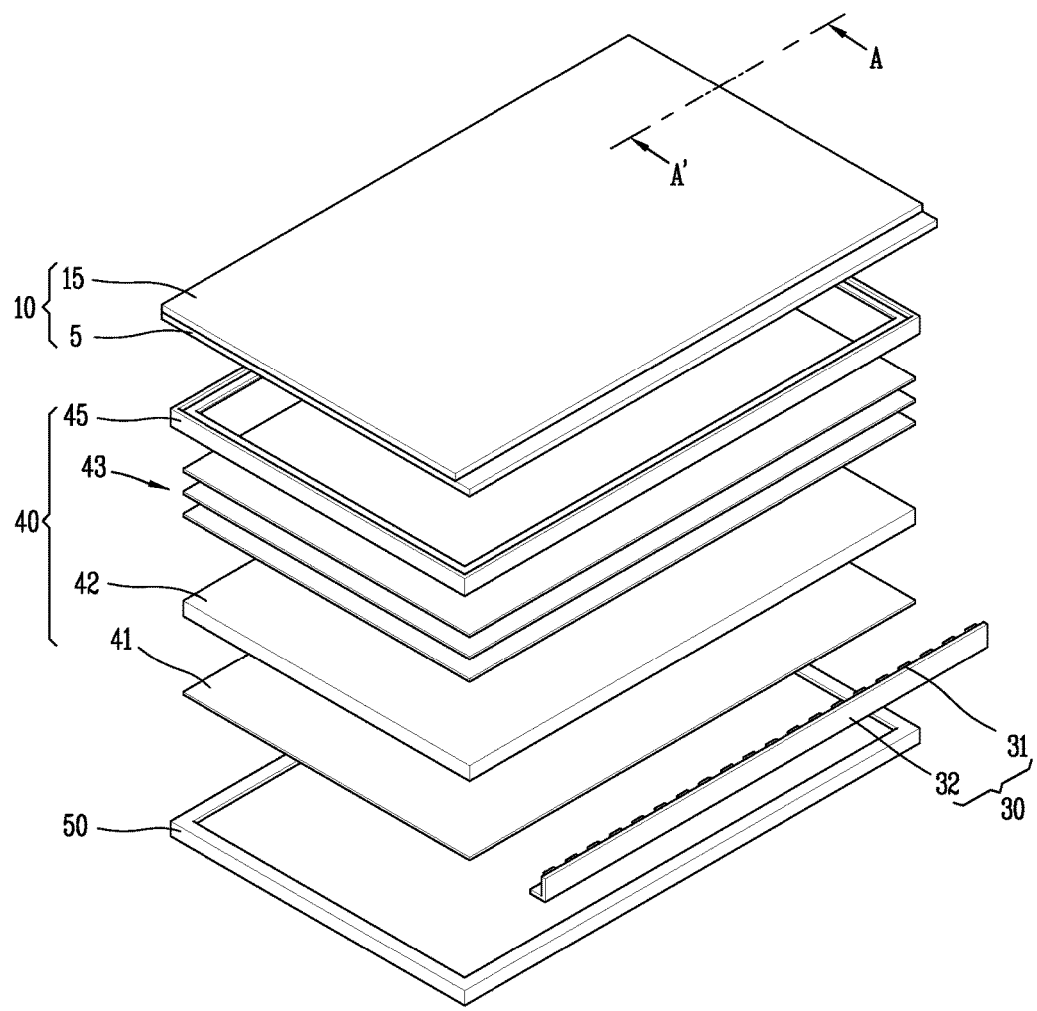
FIG. 1 is an exploded perspective view schematically illustrating the structure of a typical liquid crystal display device.
Figure 2:
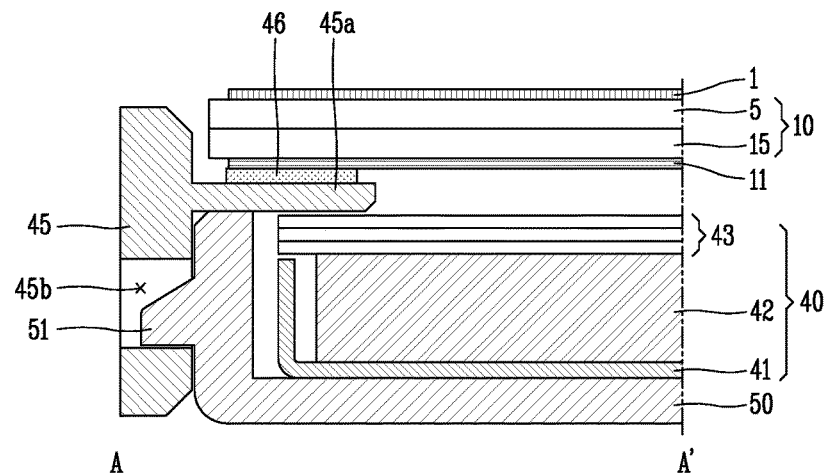
FIG. 2 is a view schematically illustrating a cross-section taken along line A-A' in the typical liquid crystal display device illustrated in FIG. 1.

Hereinafter, embodiments of the present disclosure will be described in detail with reference to the accompanying drawings to such an extent that the present disclosure can be easily embodied by a person having ordinary skill in the art to which the present disclosure pertains.

Advantages and features of the present disclosure, and methods of accomplishing the same will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present disclosure is to be defined only by the scope of the appended claims. Further, like reference numerals refer to like or similar elements throughout the specification. In the drawings, the size and relative size of layers and regions may be exaggerated for the clarity of the description.

An element or layer referred to as being "on" another element or layer may include both a case where it is directly on another element or layer and a case where another element and layer is interposed therebetween. On the contrary, an element referred to as being "directly on" another element indicates a case where another element and layer is not interposed therebetween.

Spatially relative terms such as "below", "beneath", "lower", "above", or "upper" may be used herein to describe a correlation between one device or constituent element and other devices or constituent elements as illustrated in the drawings. It will be understood that spatially relative terms are intended to include a different direction of device during the use or operation in addition to its direction illustrated in the drawings. For example, when a device in the drawing is turned over, the device described as "below" or "beneath" another device will be placed "above" the another device. Accordingly, the exemplary terms "below" or "beneath" may include both directions of above and below. Since the device may be oriented in another direction, and thus the spatially relative terms may be interpreted in accordance with the orientation thereof.

It should be noted that the terms used herein are merely used to describe the embodiments, but not to limit the present disclosure. In the present specification, unless clearly used otherwise, expressions in a singular form include a plural form. The term "comprises" and/or "comprising" used in the specification intend to express a constituent element, a step, an operation and/or a device does not exclude the existence or addition of one or more other constituent elements, steps, operations and/or devices.

Figure 3:
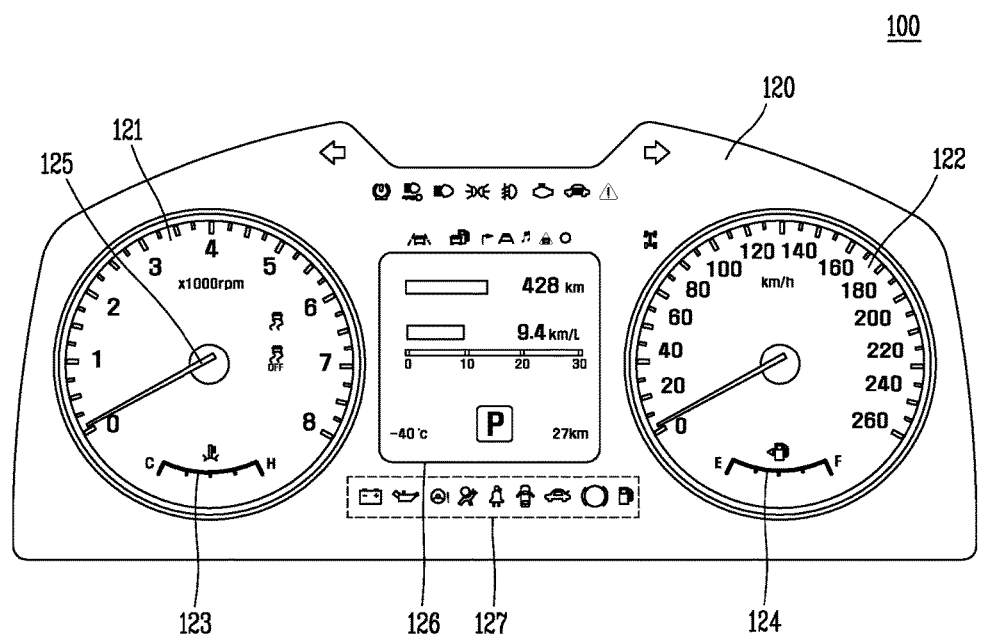
FIG. 3 is a plan view illustrating an irregular shape display according to a first embodiment of the present disclosure for an example.

FIG. 3 is a plan view illustrating an irregular shape display according to a first embodiment of the present disclosure for an example.

Figure 4:
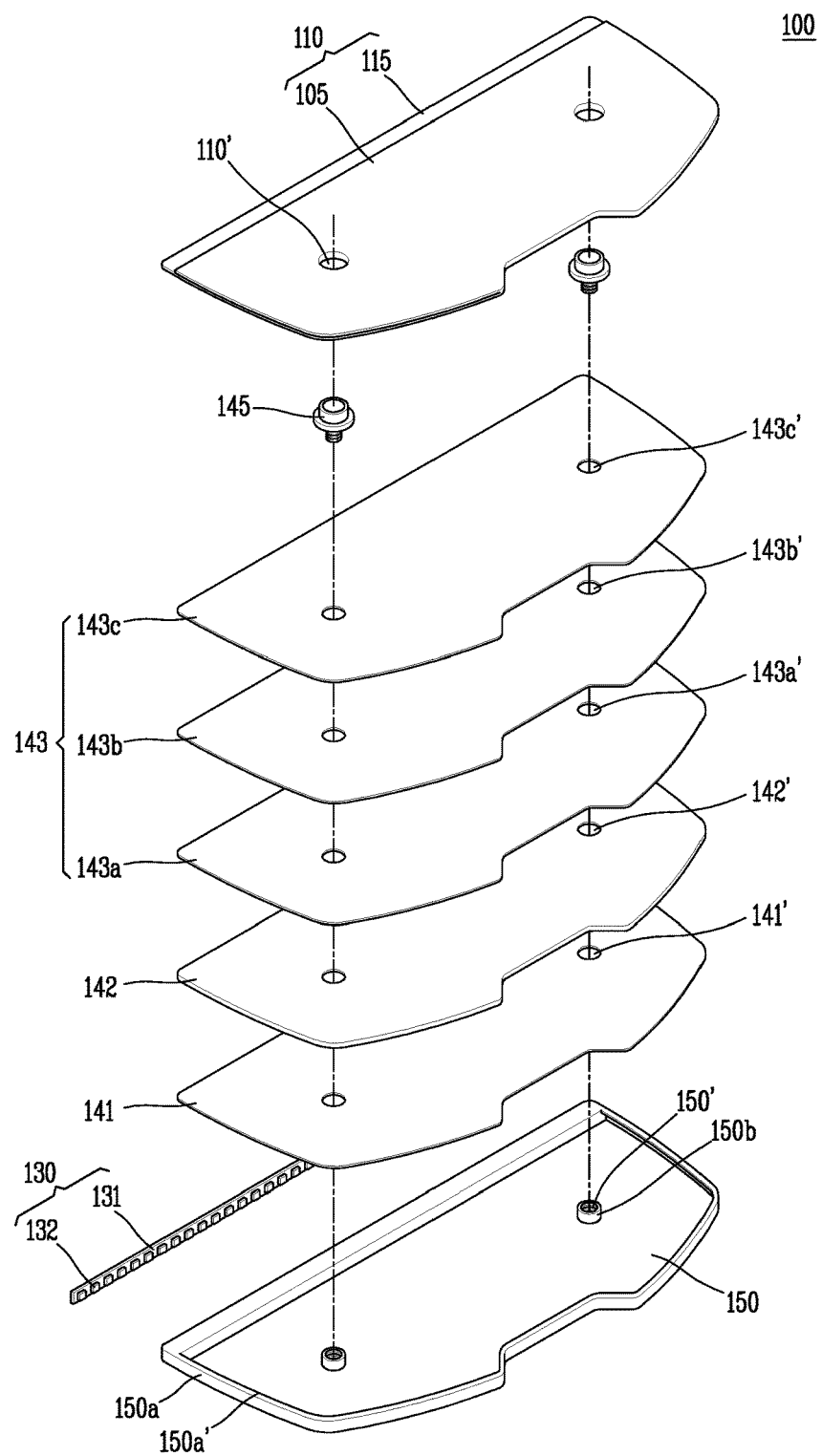
FIG. 4 is an exploded perspective view schematically illustrating the structure of the irregular shape display according to the first embodiment of the present disclosure illustrated in FIG. 3.

Furthermore, FIG. 4 is an exploded perspective view schematically illustrating the structure of the irregular shape display according to the first embodiment of the present disclosure illustrated in FIG. 3.

Figure 5:
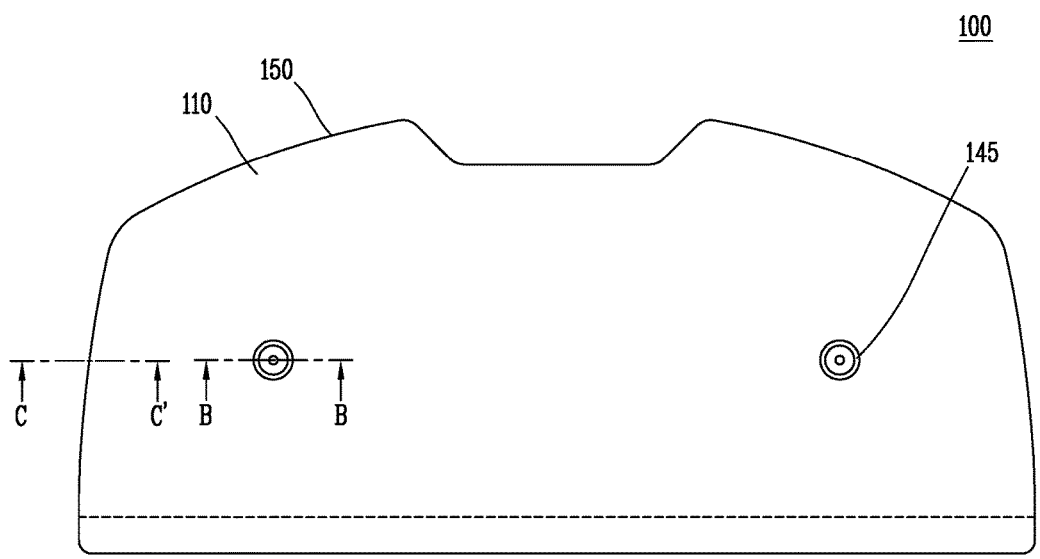
FIG. 5 is a view schematically illustrating the planar structure of the irregular shape display according to the first embodiment of the present disclosure illustrated in FIG. 3.

FIG. 5 is a view schematically illustrating the planar structure of the irregular shape display according to the first embodiment of the present disclosure illustrated in FIG. 3.

Figure 6:
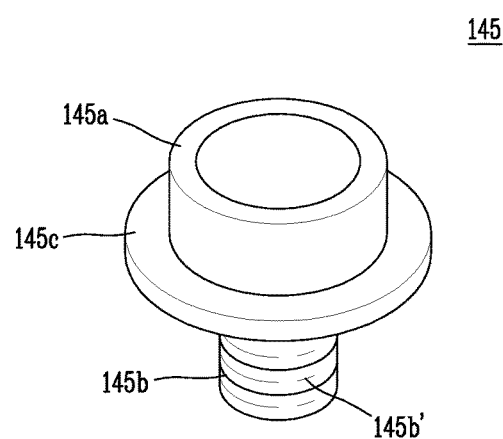
FIG. 6 is a perspective view schematically illustrating the structure of a guide member in the irregular shape display according to the first embodiment of the present disclosure illustrated in FIG. 5.

FIG. 6 is a perspective view schematically illustrating the structure of a guide member in the irregular shape display according to the first embodiment of the present disclosure illustrated in FIG. 5.

Figure 7A:
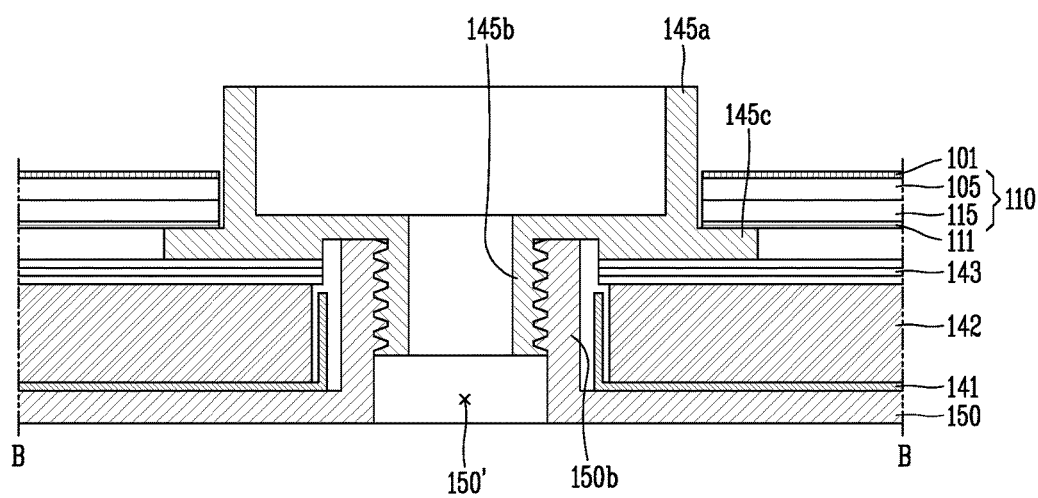
FIGS. 7A and 7B are views schematically illustrating a cross-section taken along line B-B' and line C-C' in the irregular shape display according to the first embodiment of the present disclosure illustrated in FIG. 5.
Figure 7B:
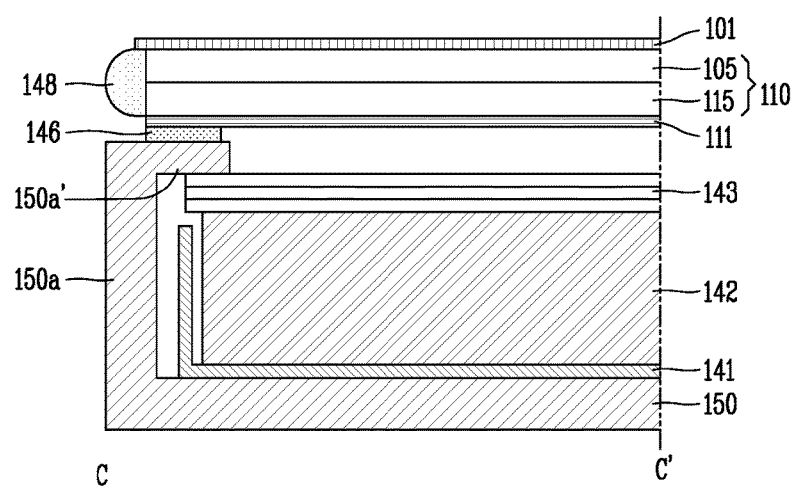

FIGS. 7A and 7B are views schematically illustrating a cross-section taken along line B-B' and line C-C' in the irregular shape display according to the first embodiment of the present disclosure illustrated in FIG. 5. In other words, FIG. 7A illustrates a cross-section around a hole as an example, and FIG. 7B illustrates a cross-section of an edge portion of the hole as an example.

Figure 8A:
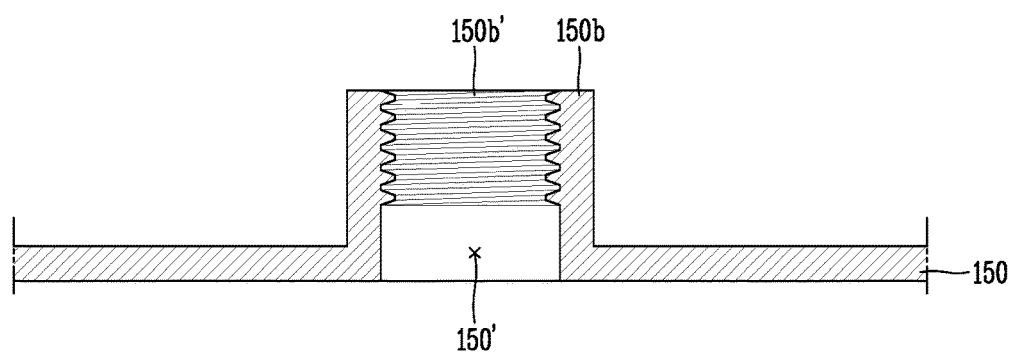
FIGS. 8A and 8B are cross-sectional views schematically illustrating a lower cover and a guide member according to the first embodiment of the present disclosure illustrated in FIG. 7A.
Figure 8B:
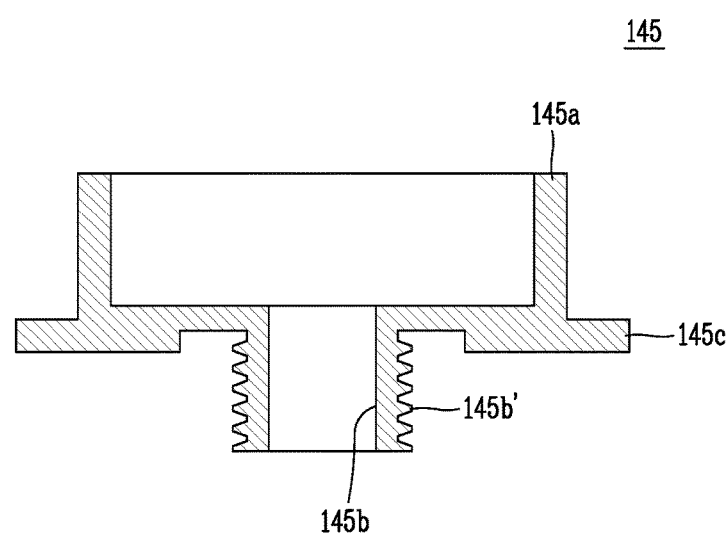

FIGS. 8A and 8B are cross-sectional views schematically illustrating a lower cover and a guide member according to the first embodiment of the present disclosure illustrated in FIG. 7.

An irregular shape display referred to in the present disclosure may refer to as a display having a shape of which is modified in various ways such as a circular, diamond or elliptical shape out of the existing rectangular display or mixed with various shapes, and the irregular shape display according to the present disclosure may apply a narrow bezel structure less than 1.5 mm to satisfy user's convenience.

Furthermore, the present disclosure may include one or more holes capable of allowing a mechanical part such as a physical button, an indicator hand on a second hand, a minute hand, and an hour hand, a needle (pointer) of an instrument panel, and the like to pass therethrough within a screen area of such an irregular shape display.

However, the present disclosure may not exclude the existing rectangular display, and may be also applicable to a case where one or more holes are provided within a screen area of a rectangular display. In other words, a display according to the present disclosure may have a curved shape such as a circular or elliptical shape or a polygonal shape such as a rectangular or diamond shape or may have a mixed shape with various shapes.

The hole may also have a curved shape such as a circular or elliptical shape or a polygonal shape such as a rectangular or diamond shape or may have a mixed shape with various shapes.

Here, a vehicle dashboard is taken as an example for an irregular shape display according to a first embodiment of the present disclosure illustrated in FIGS. 3 through 8A and 8B, but the present disclosure may not be necessarily limited to this.

Referring to FIG. 3, a vehicle dashboard 100 referred to as a cluster gauge is a dashboard for notifying a driver of the overall driving status of a vehicle, wherein the driver looks at the vehicle dashboard from time to time while keeping his or her eyes forward to determine the driving status.

An irregular shape display according to a first embodiment of the present disclosure, namely, the vehicle dashboard 100 may include a tachometer 121, a speedometer 122, a coolant temperature gauge 123, an oil gauge 124, and the like, and exhibit an engine rotation speed of the vehicle, a speed of the vehicle, coolant temperature and oil condition information sensed through sensors (not shown) through a change of movement of a needle (pointer) 125.

Here, for an example, the tachometer 121 may be located at the left side of the vehicle dashboard 100, and indicate an engine rotation speed, namely, revolution per minute (RPM), by the needle 125.

The speedometer 122 may be located at the right side of the vehicle dashboard 100, and indicate the speed of the vehicle by the needle 125.

As a result, a driver may read a number indicated by the needle 125 to obtain the status information of the vehicle during driving and refer to the information to take an action such as adjusting the speed while driving the vehicle or the like.

In other words, while driving the vehicle, the driver may check the speedometer 122 to recognize the speed of the vehicle during driving, and recognize a revolution per minute of the engine through the tachometer 121.

Furthermore, when the remaining amount of fuel is reduced to be less than a set value, the oil gauge 124 may turn on a warning lamp to allow a driver to recognize a fuelling time.

The coolant temperature gauge 123 may allow a driver to recognize the coolant temperature of the engine to prevent malfunctions and damages due to overheating.

As described above, a scale is displayed on a gauge such as the tachometer 121, the speedometer 122, the coolant temperature gauge 123 and the oil gauge 124, and the needle 125 moving along the scale based on a change of a target value displayed on each gauge is provided thereon. Accordingly, a driver may read the scale on a portion located with the needle 125 to check the target value displayed on each gauge.

Here, the vehicle dashboard 100 according to the first embodiment of the present disclosure may include a display unit 120 for displaying the foregoing engine rotation speed of the vehicle, the speed of the vehicle, the coolant temperature and oil condition information, and the like, and the display unit 120 may implement an image displayed through a liquid crystal panel, for example.

The display unit 120 may have a shape mixed with various shapes such as a straight line, a curved line and the like, and for an example, a portion excluding a hole (not shown) for allowing the needle 125 of the tachometer 121 and speedometer 122 to pass therethrough may be a display area.

Accordingly, the vehicle dashboard 100 may display the text plates 126, 127 of the tachometer 121, the speedometer 122, the coolant temperature gauge 123 and the oil gauge 124, and other information, and mark predetermined numbers according to the scale to exhibit numerical values such as an RPM, a speed, a coolant temperature and an amount of oil.

Referring to FIGS. 4 through 8A and 8B, an irregular shape display 100 according to a first embodiment of the present disclosure may largely include a liquid crystal panel 110 in which liquid crystals are injected between a color filter substrate 105 and an array substrate 115 to display an image, a backlight unit provided on a rear surface of the liquid crystal panel 110 to emit light over the entire surface of the liquid crystal panel 110, and a lower cover 150 configured to accommodate and fix the liquid crystal panel 110 and backlight unit.

The liquid crystal panel 110 may include the color filter substrate 105 in which pixels are arranged in a matrix form to display an image, and bonded thereto to maintain a uniform cell gap to face each other, an array substrate 115, and a liquid crystal layer (not shown) formed in a cell gap between the color filter substrate 105 and array substrate 115.

Though not shown in detail in the drawing, a common electrode and a pixel electrode are formed on the liquid crystal panel 110 bonded to the color filter substrate 105 and array substrate 115 to apply an electric field to the liquid crystal layer, and when a voltage of a data signal applied to the pixel electrode is controlled in a state that a voltage is applied to the common electrode, liquid crystals in the liquid crystal layer rotate by dielectric anisotropy according to the electric field between the common electrode and the pixel electrode to transmit or block light for each pixel, thereby displaying a text or image.

Here, a switching element such as a thin film transistor (TFT) may be individually provided on pixels to control the voltage of the data signal applied to the pixel electrode for each pixel.

In other words, a gate line and a data line, which are vertically and horizontally arranged to define a pixel region, are formed on the array substrate 115, and a thin film transistor which is a switching device is formed at an intersection region between the gate line and data line.

The thin film transistor may include a gate electrode connected to a gate line, a source electrode connected to a data line and a drain electrode connected to a pixel electrode.

The color filter substrate 105 may include a color filter configured with a plurality of sub-color filters for implementing red, green and blue colors, a black matrix for dividing between sub-color filters and blocking light passing through the liquid crystal layer, and an overcoat layer formed on the color filter and the black matrix.

Upper and lower polarizers 101, 111 (FIGS. 7A and 7B) are adhered to an outer side of the color filter substrate 105 and array substrate 115, wherein the lower polarizer 111 polarizes light that has passed through the backlight unit 140, and the upper polarizer 101 polarizes light that has passed through the liquid crystal panel 110.

Here, an edge side of the liquid crystal panel 110 bonded to the color filter substrate 105 and array substrate 115 may be sealed with a sealing material 148 (shown in FIG. 7B) through side sealing. However, the present disclosure may not be necessarily limited to this. Furthermore, as illustrated in FIG. 10, the upper polarizer 101 may be adhered to cover part of the sealing material 148, but the present disclosure may not be necessarily limited to this.

Describing the backlight unit 140 according to the first embodiment of the present disclosure in detail, a light source unit 130 including a light source 132 for generating light may be provided at one side of a light guide plate 142, and a reflector 141 may be provided on rear surface of the light guide plate 142.

Furthermore, a plurality of optical sheets 143 for enhancing an efficiency of light exited from the light guide plate 142 to irradiate on the liquid crystal panel 110 may be disposed on an upper surface of the light guide plate 142.

However, the present disclosure may not be necessarily limited to the foregoing structure of the backlight unit 140, and the backlight unit 140 having any structure may be also applicable to any irregular shape display 100 according to the present disclosure.

The light guide plate 142 receives light from the light source 132, and guides the light to the side of the liquid crystal panel 110. Here, the light provided from the light source 132 is provided to an incident surface of the light guide plate 142. The incident surface faces one side portion 150a among the side portions 150a of the lower cover 150. In other words, the light source 132 is located on the one side portion 150a of the lower cover 150, and the incident surface of the light guide plate 142 faces the light exit surface of the light source 132.

The light guide plate 142 may be formed a plastic such as polymethyl methacrylate (PMMA) or polycarbonate (PC).

The reflector 141 is located between the lower cover 150 and a rear surface of the light guide plate 142. The reflector 141 performs the role of reflecting light from the light source 132 and the light from the light guide plate 142 to the side of the liquid crystal panel 110. Here, FIGS. 7A and 7B illustrate a case where the reflector 141 is formed in a shape of surrounding an edge side of the light guide plate 142 including the vicinity of the fifth hole 150' (in this case, having an effect of solving a negative portion around the fifth hole 150') as an example, but the present disclosure may not be necessarily limited to this.

Furthermore, the light source 132 may be selected from any one of a cold cathode fluorescence lamp (CCFL), a hot cathode fluorescence lamp (HCFL), an external electrode fluorescence lamp (EEFL) and a light emitting diode (LED), but may not be necessarily limited to this. Hereinafter, for the sake of convenience of explanation, a case where an LED array is used for the light source 132 will be taken as an example.

The LED array may include a light-emitting package provided with at least one LED. The light-emitting package may be a light-emitting package having different colors, for example, a red light emitting diode, a green light emitting diode and a blue light emitting diode.

For example, the LED array may be provided on a flexible printed circuit board (FPCB) 131 such that a light exit surface thereof faces an incident surface of the light guide plate 142. In other words, the light source unit 130 may include the flexible printed circuit board 131 and a plurality of light sources 132 such as an LED array mounted on one surface of the flexible printed circuit board 131. The flexible printed circuit board 131 as a circuit board in which a complex circuit is formed on a flexible insulating film is a board using a heat-resistant plastic film such as polyester or polyimide which is a flexible material.

The light source 132 may be connected to an inverter to receive power to emit light.

Light emitted from the light source 132 is incident to a lateral surface of the light guide plate 142 having a transparent material, and the reflector 141 disposed on a rear surface of the light guide plate 142 reflects light transmitted through the rear surface of the light guide plate 142 to the side of the optical sheets 143 on an upper surface of the light guide plate 142, thereby reducing the loss of light and enhancing the uniformity.

Here, the optical sheets 143 may include a diffusion sheet 143a and a prism sheet 143b, and a luminance enhancement film 143c such as a dual brightness enhancement film (DBEF) and a protective sheet may be added thereto.

The optical sheets 143 may be provided between an upper surface of the light guide plate 142 and a rear surface of the liquid crystal panel 110. The prism sheet 143b condenses light from the light guide plate 142, and the diffusion sheet 143a diffuses light from the prism sheet 143b, and the protective sheet performs the role of protecting the luminance enhancement film 143c, prism sheet 143b and optical sheets 143. Light that has passed through the protective sheet is provided to the side of the liquid crystal panel 110.

The backlight unit having the foregoing structure is accommodated into the lower cover 150.

The lower cover 150 may include a plurality of side portions 150a extended in perpendicular to the bottom. The side portions 150a may be extended in perpendicular thereto to a predetermined height from each edge of the lower cover 150. The edges of the side portions 150a adjacent to each other may be connected to each other.

Each of the side portions 150a may include mounting portions 150a' bent toward the center of the irregular shape display 100 to have a predetermined width, and the liquid crystal panel 110 may be mounted on the mounting portions 150a'.

A space surrounded by the side portions 150a and the mounting portions 150a' constitutes an accommodation space in which the backlight unit is accommodated. In other words, it is seen that the side portions 150a and mounting portions 150a' are bent in a "⌐"-shape from the bottom of the lower cover 150. Accordingly, the reflector 141, the light guide plate 142 and the optical sheets 143 are accommodated into the lower cover 150, and the light guide plate 142 and the optical sheets 143 may be fixed to an inner portion of the lower cover 150 by the side portions 150a and the mounting portions 150a' of the lower cover 150 bent in a "⌐"-shape.

According to such a guide panel integrated lower cover 150 of the present disclosure, the side portions 150a and the mounting portions 150a' of the lower cover 150 bent in a "⌐"-shape perform the role of a guide panel in the related art, so that a narrow bezel can be implemented by eliminating the guide panel.

Here, an accommodation groove in which a plurality of light sources 132 and the flexible printed circuit board 131 are accommodated may be formed at one side of the inner portion of the lower cover 150 corresponding to the light source unit 130.

Furthermore, a predetermined shielding tape 146 (shown in FIG. 7B) may be provided at an upper portion of the backlight unit 140 having the foregoing structure.

The shielding tape 146 may correspond to a region corresponding to the light source unit 130 and an edge of the lower cover 150, and perform the role of fixing the liquid crystal panel 110 to the lower cover 150 and/or guide member 145. An adhesive may be applied on both surfaces of the shielding tape 146 to perform the role of fixing the liquid crystal panel 110 to the backlight unit, namely, the lower cover 150, and the entire thereof may be of black to perform the role of preventing light emitted from the backlight unit from being leaked out to the outside.

In the irregular shape display 100 according to the first embodiment of the present disclosure having the foregoing configuration, the liquid crystal panel 110 may have the irregular shape display 100, for example, a shape corresponding to an outer shape of the vehicle dashboard, based on a display surface thereof. In addition, the mechanism and optical components of the backlight unit, namely, the optical sheets 143, the light guide plate 142, the reflector 141 and the lower cover 150, may have a shape corresponding to an outer shape of the irregular shape display 100 as a whole. However, the present disclosure may not be necessarily limited to this, and may have a curved shape such as a circular or elliptical shape or a polygonal shape such as a rectangular or diamond shape or may have a mixed shape with various shapes.

Furthermore, a first hole 110', second holes 143a', 143b', 143c', a third hole 142', a fourth hole 141' and a fifth hole 150' with a circular shape may be formed in predetermined regions of the left and right sides of the liquid crystal panel 110, the optical sheets 143, the light guide plate 142, the reflector 141 and the lower cover 150. However, the present disclosure may not be necessarily limited to this. For example, the first hole 110', the second holes 143a', 143b', 143c', the third hole 142', the fourth hole 141' and the fifth hole 150' may also have a curved shape such as a circular or elliptical shape or a polygonal shape such as a rectangular or diamond shape or may have a mixed shape with various shapes.

When the irregular shape display 100 is applied to the vehicle dashboard, the first hole 110', the second holes 143a', 143b', 143c', the third hole 142', the fourth hole 141' and the fifth hole 150' may be holes through which the needles of the tachometer and the speedometer penetrate.

The liquid crystal panel 110 may display an image in a region excluding the first hole 110' during actual display.

For an example, the first hole 110' may have a diameter larger than that of the second holes 143a', 143b', 143c', the third hole 142' and the fourth hole 141', and the second holes 143a', 143b', 143c', the third hole 142' and the fourth hole 141' may have a diameter larger than that of the fifth hole 150'.

As described above, the fifth hole 150' with a circular shape may be formed in predetermined regions of the left and right sides of the lower cover 150, and a protruding portion 150b protruded along an edge of the fifth hole 150' may be formed thereon.

The protruding portion 150b may be formed with a structure protruded from an edge of the fifth hole 150' in the direction of the liquid crystal panel 110, and a predetermined female thread 150b' may be formed at an inner side of the protruding portion 150b according to a first embodiment of the present disclosure. However, the present disclosure may not be necessarily limited to this, and a male thread may be formed at an inner side of the protruding portion 150b, and a female thread or male thread may be formed at an outer side of the protruding portion 150b. The female thread 150b' may be formed with a predetermined depth from an upper end of the protruding portion 150b.

A height of the protruding portion 150b may be the same as or larger than the sum of the heights of the reflector 141, the light guide plate 142 and the optical sheets 143 based on an inner surface of the lower cover 150.

A lateral surface corresponding to the second holes 143a', 143b', 143c', the third hole 142' and the fourth hole 141' of the optical sheets 143a, 143b, 143c, the light guide plate 142 and the reflector 141 may be brought into contact with a lateral surface of the protruding portion 150b, or located in the vicinity thereof. In other words, the protruding portion 150b of the lower cover 150 passes through the second holes 143a', 143b', 143c', the third hole 142' and the fourth hole 141' to accommodate the optical sheets 143a, 143b, 143c, the light guide plate 142 and the reflector 141 into the lower cover 150.

Furthermore, the guide member 145 is located thereon, and particularly, the guide member 145 according to the first embodiment of the present disclosure may be partially provided only in the left and right hole regions while performing the role of the existing guide panel.

In other words, the present disclosure may be provided with a guide member 145 partially provided only in a hole region other than a guide panel in a rectangular frame shape that surrounds an edge of the display as in the related art.

The guide member 145 according to the first embodiment of the present disclosure is placed on the protruding portion 150b in a state of being inserted into the protruding portion 150b of the lower cover 150, for example, the fifth hole 150' of the protruding portion 150b. Accordingly, the guide member 145 may be formed with a male thread 145b' corresponding to a female thread of the protruding portion 150b at a portion inserted to the protruding portion 150b.

The guide member 145 performs the role of supporting the liquid crystal panel 110, and to this end, the guide member 145 may include a body 145a having a cylindrical shape into which the liquid crystal panel 110 is inserted, a mounting portion 145c extended in an outward direction from an outer circumferential surface of the body 145a, on which an edge of the liquid crystal panel 110 is mounted, and a fastening portion 145b extended downward from an inner edge of the mounting portion 145c and fastened to the protruding portion 150b of the lower cover 150.

The body 145a may have a cylindrical shape and may be inserted into the first hole 110' of the liquid crystal panel 110.

The mounting portion 145c may have a flat cylindrical shape, and extended in an outward direction from an outer circumferential surface of the body 145a by a predetermined width, and an edge of the liquid crystal panel 110 around the first hole 110' may be mounted thereon. Here, the liquid crystal panel 110, namely, the lower polarizer 111, may be mounted on the mounting portion 145c through a predetermined adhesive tape.

In addition, an inner edge of the mounting portion 145c may be extended downward to constitute the fastening portion 145b having a cylindrical shape, and an external diameter and an internal diameter of the fastening portion 145b may have a size smaller than those of the body 145a.

The fastening portion 145b may be inserted and fastened to the protruding portion 150b of the lower cover 150, and restricted in the X, Y and Z directions, and to this end, a male thread 145b' corresponding to a female thread of the protruding portion 150b may be formed at an outer side of the fastening portion 145b. However, the present disclosure may not be necessarily limited to this, and when a male thread is formed at an inner side of the protruding portion 150b as described above, a female thread corresponding to a male thread of the protruding portion 150b may be formed at an outer side of the fastening portion 145b. In this case, the guide member 145 is rotated and the fastening portion 145b is inserted and fastened to the protruding portion 150b of the lower cover 150.

Furthermore, when a female thread or a male thread is formed at an outer side of the protruding portion 150b, a male thread or a female thread corresponding to the female thread or the male thread, respectively, of the protruding portion 150b may be formed at an inner side of the fastening portion 145b. In this case, the protruding portion 150b may be inserted and fastened to an inner side of the fastening portion 145b.

The male thread 145b' may be formed with a predetermined height from a lower end of the fastening portion 145b.

As described above, according to the present disclosure, a partial cylindrical shape guide member may be applicable to a hole region while at the same time fastening between the guide member and the lower cover, and thus it may not be required to form a hook on an outer side of the lower cover as in the related art or form a hook on a lateral surface of the guide member. Accordingly, fastenability between the guide member and lower cover may be further secured, thereby preventing a rattle noise due to the detachment and splitting and component floating of the optical sheets.

In particular, in case of an irregular shape display to which a hole is applied, the molding and dimensional management of a hook within a hole is restrictive. In other words, there may be difficulty in dimensional management and moldability during the formation of a hook at an inner side of the guide member, thus causing a burr or mold damage when a hook is formed at an inner side of the guide member. Furthermore, when fastening between the guide member and the lower cover is not carried out to cause a lift, the detachment, light leakage or the like of the optical sheets may occur, thereby deteriorating image quality.

As described above, the present disclosure may be also applicable to a case where a female thread or a male thread is formed at an outer side of the protruding portion, and a male thread or a female thread corresponding to the female thread or the male thread, respectively, of the protruding portion of the protruding portion is formed at an inner side of the fastening portion. In this case, the protruding portion may be inserted and fastened to an inner side of the fastening portion, and it will be described in detail through a second embodiment of the present disclosure.

Figure 9A:
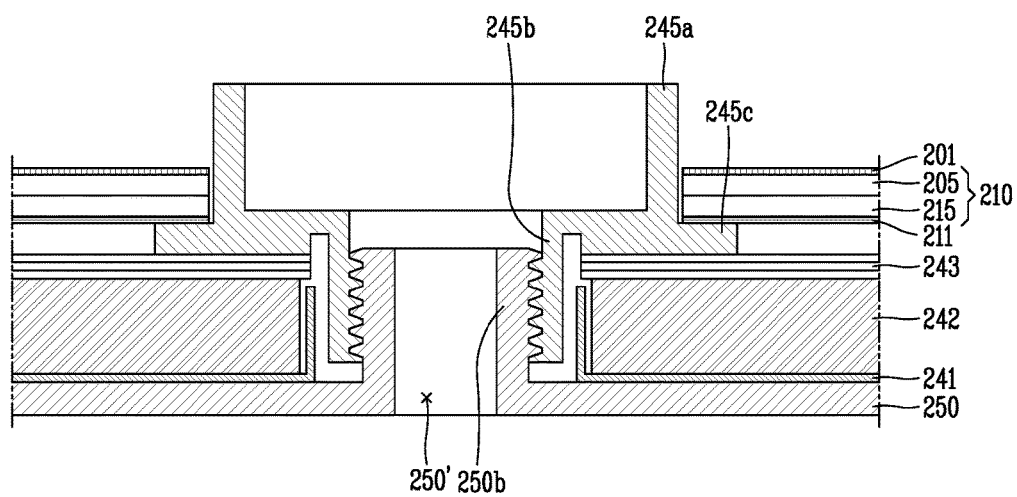
FIGS. 9A and 9B are views schematically illustrating a partial cross-section of an irregular shape display according to a second embodiment of the present disclosure.
Figure 9B:
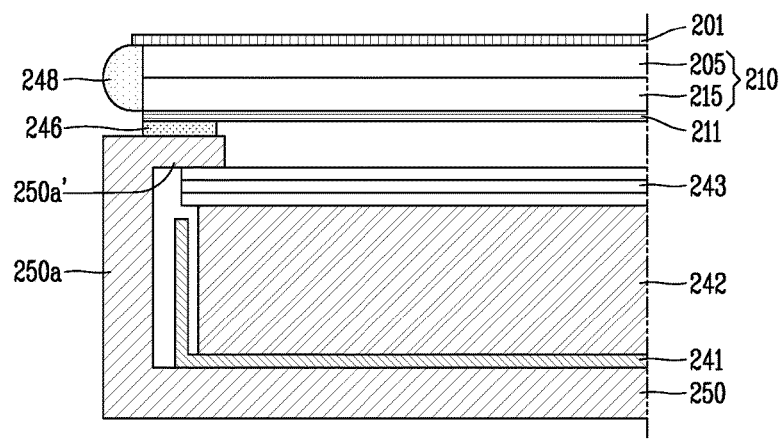

FIGS. 9A and 9B are views schematically illustrating a partial cross-section of an irregular shape display according to a second embodiment of the present disclosure.

Figure 10A:
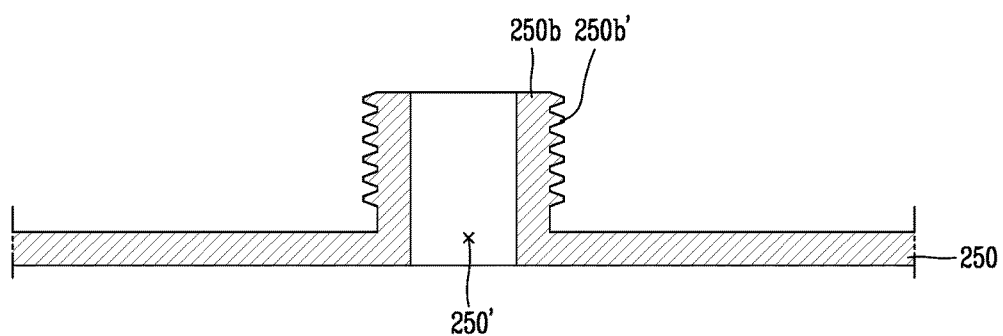
FIGS. 10A and 10B are cross-sectional views schematically illustrating a lower cover and a guide member according to the second embodiment of the present disclosure illustrated in FIG. 9A.
Figure 10B:
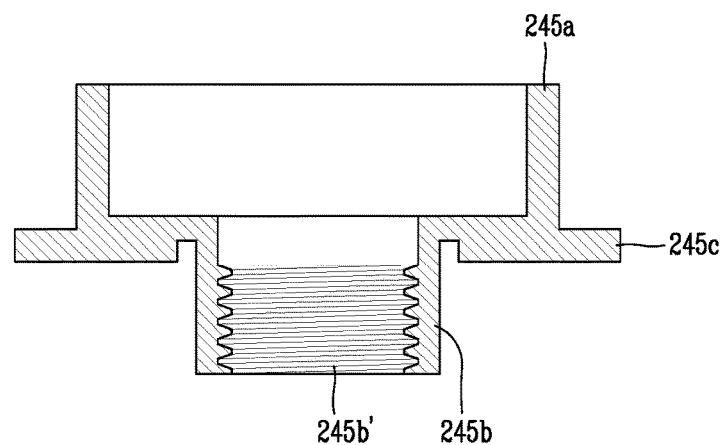

Furthermore, FIGS. 10A and 10B are cross-sectional views schematically illustrating a lower cover and a guide member according to the second embodiment of the present disclosure illustrated in FIG. 9A.

Here, the irregular shape display according to the second embodiment of the present disclosure illustrated in FIGS. 9A, 9B, 10A and 10B may have substantially the same configuration as that of the foregoing first embodiment of the present disclosure except for the fastening structure between the guide member and lower cover.

Referring to FIGS. 9A, 9B, 10A and 10B, the irregular shape display according to the second embodiment of the present disclosure may include a liquid crystal panel 210 in which liquid crystals are injected between a color filter substrate 205 and an array substrate 215 to display an image, a backlight unit provided on a rear surface of the liquid crystal panel 210 to emit light over the entire surface of the liquid crystal panel 210, and a lower cover configured to accommodate and fix the liquid crystal panel 210 and the backlight unit.

As described above, the liquid crystal panel 210 may include the color filter substrate 205 in which pixels are arranged in a matrix form to display an image, and bonded thereto to maintain a uniform cell gap to face each other, the array substrate 215, and the liquid crystal layer formed in the cell gap between the color filter substrate 205 and the array substrate 215.

An edge side of the liquid crystal panel 210 bonded to the color filter substrate 205 and the array substrate 215 may be sealed with a sealing material 248 through side sealing. However, the present disclosure may not be necessarily limited to this.

Furthermore, as illustrated in the drawing, the upper polarizer 201 may be adhered to cover a part of the sealing material 248, but the present disclosure may not be necessarily limited to this.

Describing the backlight unit according to the second embodiment of the present disclosure in detail, a light source unit (not shown) including a light source for generating light may be provided at one side of a light guide plate 242, and a reflector 241 may be provided on rear surface of the light guide plate 242.

Furthermore, a plurality of optical sheets 243 for enhancing an efficiency of light exited from the light guide plate 242 to irradiate on the liquid crystal panel 210 may be disposed on an upper surface of the light guide plate 242.

However, the present disclosure may not be necessarily limited to the foregoing structure of the backlight unit, and the backlight unit having any structure may be also applicable to any irregular shape display according to the present disclosure.

The light guide plate 242 receives light from the light source 232, and guides the light to the side of the liquid crystal panel 210.

The light guide plate 242 may be formed a plastic such as PMMA or PC.

The reflector 241 is located between the lower cover 250 and a rear surface of the light guide plate 242. The reflector 241 performs the role of reflecting light from the light source and light from the light guide plate 242 to the side of the liquid crystal panel 210. Here, the drawing illustrates a case where the reflector 241 is formed in a shape of surrounding an edge side of the light guide plate 242 as an example, but the present disclosure may not be necessarily limited to this.

Furthermore, the light source may be selected from any one of CCFL, HCFL, EEFL and LED, but may not be necessarily limited to this. Hereinafter, for the sake of convenience of explanation, a case where an LED array is used for the light source will be taken as an example.

The LED array is provided on a flexible printed circuit board such that a light exit surface thereof faces an incident surface of the light guide plate 242. In other words, the light source unit may include the flexible printed circuit board and a plurality of light sources such as an LED array mounted on one surface of the flexible printed circuit board.

The light source may be connected to an inverter to receive power to emit light.

Light emitted from the light source is incident to a lateral surface of the light guide plate 242 having a transparent material, and the reflector 241 disposed on a rear surface of the light guide plate 242 reflects light transmitted through the rear surface of the light guide plate 242 to the side of the optical sheets 243 on an upper surface of the light guide plate 242, thereby reducing the loss of light and enhancing the uniformity.

Here, though not shown in the drawing in detail, the optical sheets 243 may include a diffusion sheet and a prism sheet, and a luminance enhancement film such as DBEF and a protective sheet may be added thereto.

The optical sheets 243 may be provided between an upper surface of the light guide plate 242 and a rear surface of the liquid crystal panel 210.

The backlight unit having the foregoing structure is accommodated into the lower cover 250.

The lower cover 250 may include a plurality of side portions 250a extended in perpendicular to the bottom. The side portions 250a may be extended in perpendicular thereto to a predetermined height from each edge of the lower cover 250. The edges of the side portions 250a adjacent to each other may be connected to each other.

Each of the side portions 250a may include mounting portions 250a' bent toward the center of the irregular shape display to have a predetermined width, and the liquid crystal panel 210 may be mounted on the mounting portions 250a'.

A space surrounded by the side portions 250a and the mounting portions 250a' constitutes an accommodation space in which the backlight unit is accommodated. In other words, it is seen that the side portions 250a and the mounting portions 250a' are bent in a "⌐"-shape from the bottom of the lower cover 250. Accordingly, the reflector 241, light guide plate 242 and the optical sheets 243 are accommodated into the lower cover 250, and the light guide plate 242 and the optical sheets 243 may be fixed to an inner portion of the lower cover 250 by the side portions 250a and the mounting portions 250a' of the lower cover 250 bent in a "⊏"-shape.

Here, an accommodation groove in which a plurality of light sources and the flexible printed circuit board are accommodated may be formed at one side of the inner portion of the lower cover 250 corresponding to the light source unit.

Furthermore, a predetermined shielding tape 246 may be provided on the backlight unit having the foregoing structure.

The shielding tape 246 may correspond to a region corresponding to the light source unit of the backlight unit and an edge of the lower cover 250, and perform the role of fixing the liquid crystal panel 210 to the lower cover 250. An adhesive may be coated on both surfaces of the shielding tape 246 to perform the role of fixing the backlight unit to the liquid crystal panel 210, namely, the low polarizer 211, and the entire thereof may be of black to perform the role of preventing light emitted from the backlight unit from being leaked out to the outside.

In the irregular shape display according to the second embodiment of the present disclosure having the foregoing configuration, the liquid crystal panel 210 may have an irregular shape display, for example, a shape corresponding to an outer shape of the vehicle dashboard, based on a display surface thereof. In addition, the mechanism and optical components of the backlight unit, namely, the optical sheets 243, the light guide plate 242, the reflector 241 and the lower cover 250, may have a shape corresponding to an outer shape of the irregular shape display as a whole. However, the present disclosure may not be necessarily limited to this, and may have a curved shape such as a circular or elliptical shape or a polygonal shape such as a rectangular or diamond shape or may have a mixed shape with various shapes.

Furthermore, as described above, a first hole, second holes, a third hole, a fourth hole and a fifth hole 250' with a circular shape may be formed in predetermined regions of the left and right sides of the liquid crystal panel 210, the optical sheets 243, the light guide plate 242, the reflector 231 and lower cover 250. However, the present disclosure may not be necessarily limited to this, the first hole, the second holes, the third hole, the fourth hole and the fifth hole 250' may also have a curved shape such as a circular or elliptical shape or a polygonal shape such as a rectangular or diamond shape or may have a mixed shape with various shapes.

When the irregular shape display is applied to the vehicle dashboard, the first hole, the second holes, the third hole, the fourth hole and the fifth hole 250' may be holes through which the needles of the tachometer and the speedometer, and the like passes.

The liquid crystal panel 210 may display an image in a region except for the first hole during actual display.

For an example, the first hole may have a diameter larger than that of the second holes, the third hole and the fourth hole, and the second holes, the third hole and the fourth hole may have a diameter larger than that of the fifth hole 250'.

As described above, the fifth hole 250' with a circular shape may be formed in predetermined regions of the left and right sides of the lower cover 250, and a protruding portion 250b protruded along an edge of the fifth hole 250' may be formed thereon.

The protruding portion 250b may be formed with a structure protruded from an edge of the fifth hole 250' in the direction of the liquid crystal panel 210, and a predetermined female thread 250b' may be formed at an inner side of the protruding portion 250b according to the second embodiment of the present disclosure. However, the present disclosure may not be necessarily limited to this. For example, a male thread may be formed at an inner side of the protruding portion 250b, or a female thread or a male thread may be formed at an outer side of the protruding portion 250b. The female thread 250b' may be formed in a predetermined depth from an upper end of the protruding portion 250b.

A height of the protruding portion 250b may be the same as or larger than the sum of the heights of the reflector 241, the light guide plate 242 and the optical sheets 243 based on an inner surface of the lower cover 250.

A lateral surface corresponding to the second holes, the third hole and the fourth hole of the optical sheets 243, the light guide plate 242 and the reflector 241 may be brought into contact with a lateral surface of the protruding portion 250b, or located in the vicinity thereof. In other words, the protruding portion 250b of the lower cover 250 passes through the second holes of the optical sheets 243, the light guide plate 242 and the reflector 241, the third hole and the fourth hole to accommodate the optical sheets 243, the light guide plate 242 and the reflector 241 into the lower cover 250.

Furthermore, the guide member 245 is located thereon, and the guide member 245 according to the second embodiment of the present disclosure may be partially provided only in the left and right hole regions.

In other words, the present disclosure may be provided with a guide member 245 partially provided only in a hole region other than a guide panel in a rectangular frame shape that surrounds an edge of the display as in the related art.

The guide member 245 according to the second embodiment of the present disclosure is placed on the protruding portion 250b in a state of being inserted into the protruding portion 250b of the lower cover 250, for example, the protruding portion 250b. Accordingly, the guide member 245 may form a female thread 245b' corresponding to a male thread of the protruding portion 250b at an inner side thereof being inserted into the protruding portion 250b.

The guide member 245 performs the role of supporting the liquid crystal panel 210, and to this end, the guide member 245 may include a body 245a having a cylindrical shape into which the liquid crystal panel 210 is inserted, a mounting portion 245c extended in an outward direction from an outer circumferential surface of the body 245a, on which an edge of the liquid crystal panel 210 is mounted, and a fastening portion 245b extended downward from an inner edge of the mounting portion 245c and fastened to the protruding portion 250b of the lower cover 250.

The body 245a may have a cylindrical shape and may be inserted into the first hole of the liquid crystal panel 210.

The mounting portion 245c may have a flat cylindrical shape, and extended in an outward direction from an outer circumferential surface of the body 245a by a predetermined width, and an edge of the liquid crystal panel 210 around the first hole may be mounted thereon. Here, the liquid crystal panel 210, namely, the lower polarizer 211, may be mounted on the mounting portion 245c through the second adhesive tape 246b.

In addition, an inner edge of the mounting portion 245c may be extended downward to constitute the fastening portion 245b having a cylinder shape, and an external diameter and an internal diameter of the fastening portion 245b may have a size smaller than those of the body 245a.

The fastening portion 245b may be inserted and fastened to the protruding portion 250b of the lower cover 250, and restricted in the X, Y and Z directions, and to this end, a female thread 245b' corresponding to a male thread of the protruding portion 250b may be formed at an inner side of the fastening portion 245b. However, the present disclosure may not be necessarily limited to this, and when a female thread is formed at an outer side of the protruding portion 250b as described above, a male thread corresponding to a female thread of the protruding portion 250b may be formed at an inner side of the fastening portion 245b. In this case, the fastening portion 245b is inserted and fastened to the protruding portion 250b of the lower cover 250 while rotating the guide member 245.

The female thread 245b' may be formed by a predetermined depth from an lower end of the fastening portion 245b.

On the other hand, as described above, the present disclosure may be also applicable to a circular display in which a display unit is circular, and will be described in detail through the following third embodiment of the present disclosure.

Figure 11:
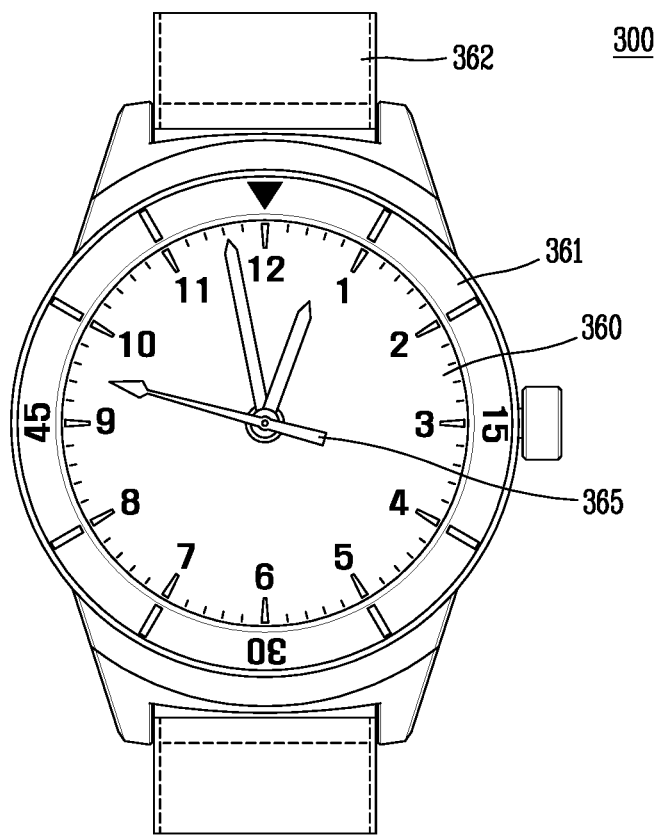
FIG. 11 is a plan view illustrating an irregular shape display according to a third embodiment of the present disclosure for an example.

FIG. 11 is a plan view illustrating an irregular shape display according to a third embodiment of the present disclosure for an example.

Figure 12:
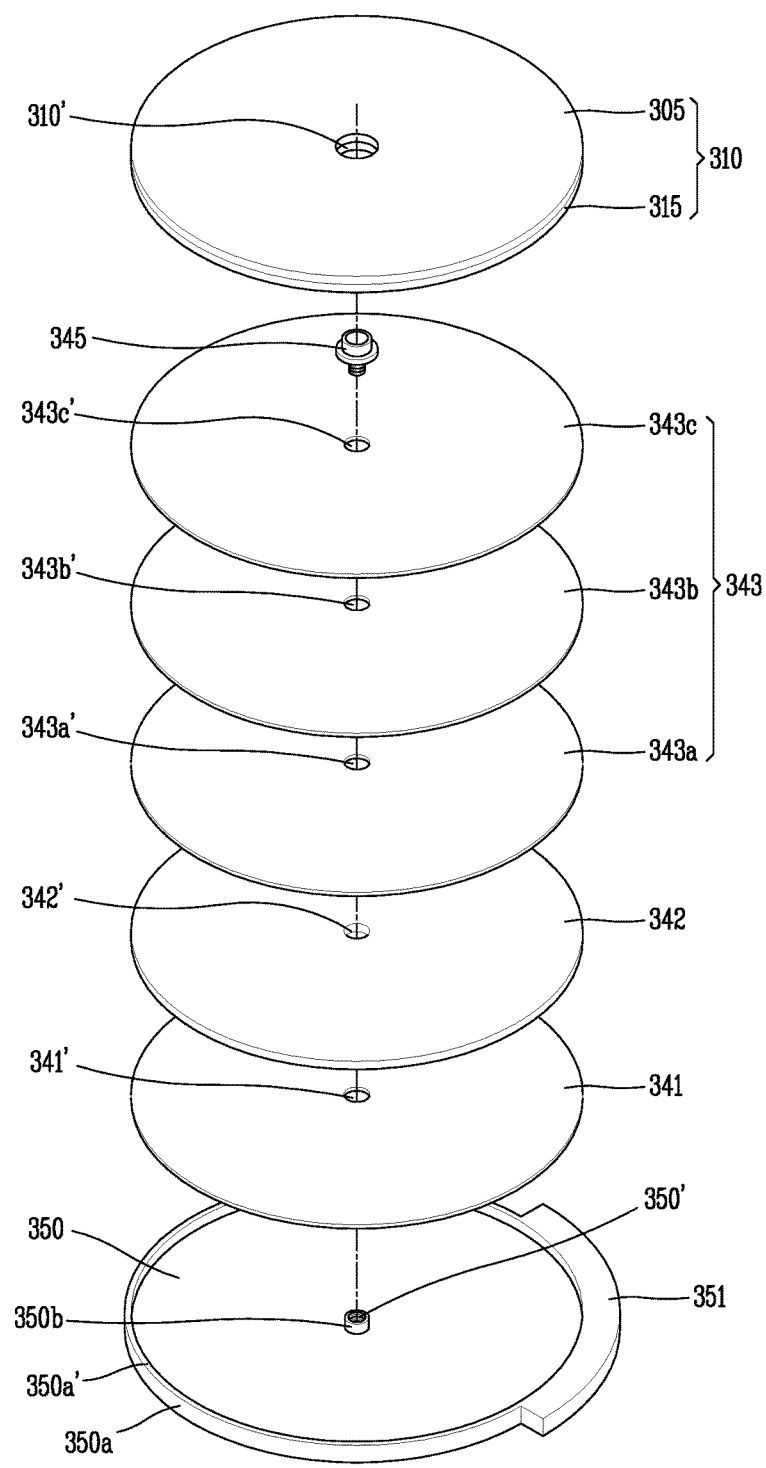
FIG. 12 is an exploded perspective view schematically illustrating the structure of the irregular shape display according to the third embodiment of the present disclosure illustrated in FIG. 11.

FIG. 12 is an exploded perspective view schematically illustrating the structure of the irregular shape display according to the third embodiment of the present disclosure illustrated in FIG. 11.

An irregular shape display in which a display unit is circular may be referred to as a circular display, and here the meaning of being circular may include the meaning of having substantially circular shape.

A wearable watch to which a circular display is applied implements a real circular shape. From a TFT design to a bezel design at an outside of the display, it is designed and developed in a perfect circular shape. It has a larger screen area than that of a square display with the same size by 57%. Through this, a circular product may display the entire screen thereof, thereby enhancing user convenience, providing low thickness applications as well as allowing a touch screen function on the entire screen.

Here, a wearable watch is taken as an example for the irregular shape display according to the third embodiment of the present disclosure illustrated in FIGS. 11 and 12, but the present disclosure may not be necessarily limited to this.

Terminals can be classified into two types, such as a mobile/portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, improving structural and software aspects in a terminal may be taken into consideration for the functional support and enhancement of the terminal.

Owing to such an improvement, in recent years, mobile terminals have been evolved into various types of designs, and a wearable watch type mobile terminal that can be fixed to a user's body has been developed.

Referring to FIG. 11, a watch type mobile terminal 300 may include a body 361 having a display unit 360 and a band 362 connected to the body 361 to be worn on a wrist.

The body 361 may include a case forming an outer appearance. The case may include a plurality of cases provided with an internal space for accommodating various electronic components. However, the present disclosure may not be necessarily limited to this, and one case may be configured to provide an internal space to implement a mobile terminal 300 with a unibody.

The cases may be formed by injection-molding a synthetic resin or may be also formed of a metallic material such as stainless steel (STS), titanium (Ti) or the like.

The watch type mobile terminal 300 may be configured to perform wireless communication, and an antenna for wireless communication may be provided in the body 361. Meanwhile, the antenna may extend the performance using a case. For example, a case including a conductive material may be electrically connected to the antenna to extend a ground area or a radiation area.

The display unit 360 may be disposed in an exposed manner on one surface of the body 361.

For an example, the display unit 360 may be disposed on a front surface of the body 361 to display information, and a touch sensor may be provided on the display unit 360 to be implemented as a touch screen.

For an example, the display unit 360 implemented by a liquid crystal panel may display numerals (1 through 12) indicating a time, and a current time may be checked by indicator hands 365 including an hour hand indicating a number corresponding to the hours according to the flow of time, a minute/second hand indicating a number corresponding to the minutes/seconds according to the flow of time.

An audio output unit, a camera, a microphone, a user input unit and the like may be provided in the body 361. When the display unit 360 is implemented as a touch screen, it may function as a user input unit, and accordingly, an additional key may not be provided in the body 361.

The band 362 may be worn on a wrist and configured to surround the wrist, and may be formed of a flexible material to facilitate wearing thereof. For such an example, the band 362 may be formed of leather, rubber, silicon, synthetic resin material or the like. Furthermore, the band 362 may be detachably configured on the body 361, and thus exchangeable with various types of bands according to a user's taste.

On the other hand, the band 362 may be used to extend the performance of the antenna. For example, a ground extension portion electrically connected to the antenna to extend a ground area may be integrated into the band.

A fastener may be provided in the band 362. The fastener may be implemented by a buckle, a snap-fittable hook structure, a Velcro (brand name) or the like, and may include a flexible section or material.

The irregular shape display according to the third embodiment of the present disclosure as described above may be configured with a donut-shaped structure based on a display unit, and used for an electronic device for displaying a donut-shaped area.

For an example, the irregular shape display of the present disclosure may be applicable to a wearable watch. Here, mechanical parts such as hour, minute and second hands of the watch may be located on an upper surface of the liquid crystal panel through a hole.

In other words, the irregular shape display of the present disclosure may have a circular shaped structure as a whole, and a hole may be formed to allow a mechanical part to pass therethrough, and thus applicable to an electronic device for displaying a donut-shaped area such as a watch or the like.

Referring to FIG. 12, the irregular shape display according to the third embodiment of the present disclosure may include a liquid crystal panel 310 in which liquid crystals are injected between a color filter substrate 305 and an array substrate 315 to display an image, a backlight unit (not shown) provided on a rear surface of the liquid crystal panel 310 to emit light over the entire surface of the liquid crystal panel 310, and a lower cover configured to accommodate and fix the liquid crystal panel 310 and the backlight unit.

As described above, the liquid crystal panel 310 may include the color filter substrate 305 in which pixels are arranged in a matrix form to display an image, and bonded thereto to maintain a uniform cell gap to face each other, the array substrate 315, and a liquid crystal layer formed in a cell gap between the color filter substrate 305 and the array substrate 315.

Describing the backlight unit according to the third embodiment of the present disclosure in detail, a light source unit (not shown) including a light source for generating light may be provided at one side of a light guide plate 342, and a reflector 341 may be provided on a rear surface of the light guide plate 342.

Furthermore, a plurality of optical sheets 343 for enhancing an efficiency of light exited from the light guide plate 342 to irradiate on the liquid crystal panel 310 may be disposed on an upper surface of the light guide plate 342.

However, the present disclosure may not be necessarily limited to the foregoing structure of the backlight unit, and the backlight unit having any structure may be also applicable to any irregular shape display according to the present disclosure.

The light guide plate 342 receives light from the light source 332, and guides the light to the side of the liquid crystal panel 310.

The light guide plate 342 may be formed a plastic such as PMMA or PC.

The reflector 341 is located between the lower cover 350 and a rear surface of the light guide plate 342. The reflector 341 performs the role of reflecting light from the light source and light from the light guide plate 342 to the side of the liquid crystal panel 310.

Light emitted from the light source is incident to a lateral surface of the light guide plate 342 having a transparent material, and the reflector 341 disposed on a rear surface of the light guide plate 342 reflects light transmitted through the rear surface of the light guide plate 342 to the side of the optical sheets 343 on an upper surface of the light guide plate 342, thereby reducing the loss of light and enhancing the uniformity.

Here, the optical sheets 343 may include a diffusion sheet 343*a* and a prism sheet 343*b*, and a luminance enhancement film 343*c* such as DBEF and a protective sheet may be added thereto.

The optical sheets 343 may be provided between an upper surface of the light guide plate 342 and a rear surface of the liquid crystal panel 310.

The backlight unit having the foregoing structure is accommodated into the lower cover 350.

The lower cover 350 may include a plurality of side portions 350*a* extended in perpendicular to the bottom. The side portions 350*a* may be extended in perpendicular thereto to a predetermined height from each edge of the lower cover 350.

The side portion 350*a* may include a mounting portion 350*a*' bent toward the center of the irregular shape display to have a predetermined width, and the liquid crystal panel 310 may be mounted on the mounting portion 350*a*'.

A space surrounded by the side portion 350*a* and the mounting portion 350*a*' constitutes an accommodation space in which the backlight unit is accommodated. In other words, it is seen that the side portion 350*a* and the mounting portion 350*a*' are bent in a "⌐"-shape from the bottom of the lower cover 350. Accordingly, the reflector 341, the light guide plate 342 and the optical sheets 343 are accommodated into the lower cover 350, and the light guide plate 342 and the optical sheets 343 may be fixed to an inner portion of the lower cover 350 by the side portion 350*a* and the mounting portion 350*a*' of the lower cover 350 bent in a "⌐"-shape.

Here, an accommodation groove 351 in which a plurality of light sources and the flexible printed circuit board are accommodated may be formed at one side of the inner portion of the lower cover 350 corresponding to the light source unit.

In the irregular shape display according to the third embodiment of the present disclosure having the foregoing configuration, the liquid crystal panel 310 may have an irregular shape display, for example, a circular shape corresponding to an outer shape of the wearable watch, based on a display surface thereof. In addition, the mechanism and optical components of the backlight unit, namely, the optical sheets 343, the light guide plate 342, the reflector 341 and the lower cover 350, may have a circular shape corresponding to an outer shape of the irregular shape display as a whole. However, the present disclosure may not be necessarily limited to this.

Furthermore, as described above, a first hole 310', second holes 343*a*', 343*b*', 343*c*', a third hole 342', a fourth hole 341' and a fifth hole 350' with a circular shape may be formed at the center of the liquid crystal panel 310, the optical sheets 343, the light guide plate 342, the reflector 331 and the lower cover 350. However, the present disclosure may not be necessarily limited to this.

When the irregular shape display is applied to the wearable watch, the first hole 310', the second holes 343*a*', 343*b*', 343*c*', the third hole 342', the fourth hole 341' and the fifth hole 350' may be holes through which indicator hands such as hour, minute and second hands passes.

The liquid crystal panel 310 may display an image in a region except for the first hole 310' during actual display.

For an example, the first hole 310' may have a diameter larger than that of the second holes 343*a*', 343*b*', 343*c*', the third hole 342' and the fourth hole 341', and the second holes 343*a*', 343*b*', 343*c*', the third hole 342' and the fourth hole 341' may have a diameter larger than that of the fifth hole 350'.

As described above, the fifth hole 350' with a circular shape may be formed at the center of the lower cover 350, and a protruding portion 350*b* protruded along an edge of the fifth hole 350' may be formed thereon.

The protruding portion 350*b* may be formed with a structure protruded from an edge of the fifth hole 350' in the direction of the liquid crystal panel 310, and a predetermined female thread 350*b*' may be formed at an inner side of the protruding portion 350*b* according to the third embodiment of the present disclosure. However, the present disclosure may not be necessarily limited to this. For example, a male thread may be formed at an inner side of the protruding portion 350*b*, or a female thread or a male thread may be formed at an outer side of the protruding portion 350*b*. The female thread 350*b*' may be formed in a predetermined depth from an upper end of the protruding portion 350*b*.

A height of the protruding portion 350*b* may be the same as or larger than the sum of the heights of the reflector 341, the light guide plate 342 and the optical sheets 343 based on an inner surface of the lower cover 350.

A lateral surface corresponding to the second holes 343*a*', 343*b*', 343*c*', the third hole 342' and the fourth hole 341' of the optical sheets 343*a*, 343*b*, 343*c*, the light guide plate 342 and the reflector 341 may be brought into contact with a lateral surface of the protruding portion 350b, or located in the vicinity thereof. In other words, the protruding portion 350b of the lower cover 350 passes through the second holes 343a', 343b', 343c', the third hole 342' and the fourth hole 341' to accommodate the optical sheets 343a, 343b, 343c, the light guide plate 342 and the reflector 341 into the lower cover 350.

Furthermore, the guide member 345 is located thereon, and the guide member 345 according to the third embodiment of the present disclosure may be partially provided only at the center thereof.

The guide member 345 according to the third embodiment of the present disclosure is placed on the protruding portion 350b in a state of being inserted into the protruding portion 350b of the lower cover 350, for example, the fifth hole 350' the protruding portion 350b. Accordingly, the guide member 345 may form a male thread corresponding to a female thread of the protruding portion 350b at an outer side thereof being inserted into the protruding portion 350b.

Though not shown in the drawing in detail, substantially similar to the foregoing first and second embodiments of the present disclosure, the guide member 345 performs the role of supporting the liquid crystal panel 310, and to this end, the guide member 345 may include a body having a cylindrical shape into which the liquid crystal panel 310 is inserted, a support portion extended in an outward direction from an outer circumferential surface of the body, on which an edge of the liquid crystal panel 310 is mounted, and a fastening portion extended downward from an inner edge of the support portion and fastened to the protruding portion 350b of the lower cover 350.

Although many subject matters have been specifically disclosed in the foregoing description, they should be construed as an illustration of embodiments rather than a limitation to the scope of disclosure. Consequently, the disclosure should not be determined by the embodiments disclosed herein but should be determined by the claims and the equivalents thereof.

What is claimed is:

1. An irregular shape display, comprising:
    a liquid crystal panel displaying an image;
    a backlight unit located at a lower portion of the liquid crystal panel;
    a lower cover configured to accommodate the liquid crystal panel and the backlight unit;
    wherein each of the liquid crystal panel and the lower cover has at least one hole provided in a predetermined region to allow a mechanical part to pass through and a guide member fastened to the lower cover through each hole in the liquid crystal panel and the lower cover,
    wherein the backlight unit comprises a light source unit generating light, a light guide plate guiding the light from the light source unit, wherein the light source unit is located at one side of the light guide plate, a reflector disposed on a rear surface of the light guide plate, and a plurality of optical sheets disposed on an upper surface of the light guide plate,
    wherein the at least one hole comprises a first hole provided at the liquid crystal panel, second holes provided at the optical sheets, a third hole provided at the light guide plate, a fourth hole provided at the reflector, and a fifth hole provided at the lower cover,
    wherein the lower cover comprises a protruding portion protruded toward the liquid crystal panel from an edge of the fifth hole, and
    wherein the guide member comprises a body having a cylindrical shape which is inserted into the first hole of the liquid crystal panel, a support portion extended in an outward direction from an outer circumferential surface of the body, on which an edge of the liquid crystal panel around the first hole is mounted, so that a part of the support portion is disposed between the liquid crystal panel and the backlight unit, and a fastening portion extended downward from an inner edge of the support portion and fastened to the protruding portion of the lower cover, which are integrally formed.

2. The irregular shape display of claim 1, wherein the liquid crystal panel, the optical sheets, the light guide plate, the reflector and the lower cover has an exterior shape to be curved, polygonal, or a mixed shape of curved and polygonal.

3. The irregular shape display of claim 1, wherein the first, second, third, fourth and fifth holes have a curved shape or polygonal shape, or have a mixed shape of a curve and a polygon.

4. The irregular shape display of claim 1, wherein the first hole has a diameter larger than those of the second, third and fourth holes, and the second, third and fourth holes have a diameter larger than that of the fifth hole.

5. The irregular shape display of claim 1, wherein the reflector has a shape surrounding a lateral edge of the light guide plate including the fifth hole.

6. The irregular shape display of claim 1, wherein the lower cover comprises:
    a plurality of side portions perpendicularly extended from the bottom; and
    a plurality of mounting portions configured with the side portions being respectively bent toward the center.

7. The irregular shape display of claim 6, wherein an edge of the liquid crystal panel is mounted on the mounting portions of the lower cover.

8. The irregular shape display of claim 6, wherein the side portions and the mounting portions of the lower cover are bent in a "⌐"-shape from the bottom of the lower cover, and the light guide plate and the optical sheets are fixed to an inner portion of the lower cover by the side portions and the mounting portions of the lower cover bent in a "⌐"-shape.

9. The irregular shape display of claim 1, wherein the protruding portion of the lower cover accommodates the optical sheets, the light guide plate and the reflector into the lower cover through the second holes, the third hole and the fourth hole.

10. The irregular shape display of claim 1, wherein the fastening portion has a cylindrical shape, and an external diameter and an internal diameter of the fastening portion have a size smaller than those of the body.

11. The irregular shape display of claim 1, wherein the guide member further comprising a thread corresponding to that of the protruding portion of the lower cove at an outer side of the fastening portion inserted into an inner side of the protruding portion.

12. The irregular shape display of claim 1, wherein the guide member further comprising a thread corresponding to that of the protruding portion of the lower cover at an inner side of the fastening portion inserted into an outer side of the protruding portion.

13. The irregular shape display of claim 1, wherein the liquid crystal panel displays the image in a region except for the hole.

14. The irregular shape display of claim 1, wherein a lateral edge of the liquid crystal panel is sealed with a sealing material through side sealing.

15. A display device having a non-tetragonal shape, comprising:
- a display panel displaying an image and having a first hole;
- a lower cover having a second hole and a cylindrical protrusion surrounding the second hole toward the display panel, wherein the cylindrical protrusion has a first thread at a lateral side; and
- a guide member having a fastening portion with a second thread and positioned through the first and second holes, wherein the guide member and lower cover are engaged by the first and second threads,
- wherein the guide member further includes a support portion extended between the display panel and the lower cover from an outer circumferential surface of the fastening portion, so that an edge of the liquid crystal panel around the first hole is mounted on the support portion of the guide member through an adhesive tape, and a part of the support portion is disposed between the liquid crystal panel and the lower cover.

16. The display device of claim 15, wherein the display device has a bezel size of less than 1.5 mm.

* * * * *